(12) United States Patent
Renz et al.

(10) Patent No.: US 9,884,503 B2
(45) Date of Patent: Feb. 6, 2018

(54) IMAGEWISE PRIMING OF NON-D2T2 PRINTABLE SUBSTRATES FOR DIRECT D2T2 PRINTING

(71) Applicant: Illinois Tool Works Inc., Glenview, IL (US)

(72) Inventors: Robert P. Renz, Ipswich (GB);
Morven McAlpine, Ipswich (GB)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/614,893

(22) Filed: Feb. 5, 2015

(65) Prior Publication Data

US 2015/0144016 A1 May 28, 2015

Related U.S. Application Data

(63) Continuation of application No. 13/844,485, filed on Mar. 15, 2013, now Pat. No. 8,969,245.

(51) Int. Cl.
| | |
|---|---|
| *B41M 5/392* | (2006.01) |
| *B41M 5/50* | (2006.01) |
| *B05D 5/04* | (2006.01) |
| *B41M 5/395* | (2006.01) |
| *B05D 3/10* | (2006.01) |
| *B32B 37/18* | (2006.01) |
| *B41M 5/52* | (2006.01) |
| *B41M 5/34* | (2006.01) |
| *B41M 5/382* | (2006.01) |
| *B41M 7/00* | (2006.01) |
| *C08K 5/053* | (2006.01) |
| *C08K 5/11* | (2006.01) |
| *C08K 5/12* | (2006.01) |

(Continued)

(52) U.S. Cl.
CPC ............. *B41M 5/395* (2013.01); *B05D 3/101* (2013.01); *B05D 5/04* (2013.01); *B32B 37/182* (2013.01); *B41M 5/345* (2013.01); *B41M 5/38264* (2013.01); *B41M 5/392* (2013.01); *B41M 5/5227* (2013.01); *B41M 7/0027* (2013.01); *C08K 5/053* (2013.01); *C08K 5/11* (2013.01); *C08K 5/12* (2013.01); *C08K 5/1345* (2013.01); *C09D 137/00* (2013.01); *B41M 2205/02* (2013.01); *Y10T 428/24802* (2015.01)

(58) Field of Classification Search
CPC ...... B41M 5/392; B41M 5/50; B41M 5/5227; B41M 2205/02; B05D 5/04
USPC ........................................................ 503/227
See application file for complete search history.

(56) References Cited

FOREIGN PATENT DOCUMENTS

EP          0399690      * 11/1998     ............ B41M 5/035

* cited by examiner

*Primary Examiner* — Bruce H Hess
(74) *Attorney, Agent, or Firm* — Patula & Associates, P.C.

(57) ABSTRACT

A method for enabling D2T2 printing onto non-D2T2 printable substrates uses a diffusible primer material provided on a dye-sheet or ribbon. The primer comprises a polymer, a release agent and a plasticizer. The release agent and the plasticizer are diffused into the substrate, while the polymer remains on the dye-sheet or ribbon. Printing of the primer onto the PC substrate is controlled via a computer image program corresponding to a colored image. This computer image program also controls the printing of the colored image at the primed locations. Accordingly, image-wise treatment of a plastic material via the primer selectively renders the PC substrate surface D2T2 printable at the point of personalization, providing for a 100% PC full card body having the colored image.

5 Claims, 6 Drawing Sheets

(51) Int. Cl.
*C08K 5/134* (2006.01)
*C09D 137/00* (2006.01)

| Example | Label | Card | Plasticiser | Release agent | Result |
|---|---|---|---|---|---|
| 1 (comparative) | Standard | PVC | None | None | Good images. |
| 2 (comparative) | Neat PC | PC | None | None | Low optical density (OD), ribbon stick |
| 3 (comparative) | Plasticiser only | PC | Dinch | None | Good OD, ribbon stick |
| 4 (comparative) | Plasticiser only | PC | DMI | None | Better OD than PC but still low, ribbon stick |
| 5 (comparative) | Plasticiser only | PC | ADP | None | Low OD, ribbon stick |
| 6 (comparative) | Plasticiser only | PC | OCT | None | Better OD than PC but still low, ribbon stick |
| 7 (comparative) | Plasticiser only | PC | Phs | None | Better OD than PC but still low, ribbon stick |
| 8 (Invention) | Plasticiser + release agent | PC | Dinch | Tego 410 | Good images, even images with black background could be printed. |
| 9 (Invention) | Plasticiser + release agent | PC | Dinch | Diax 2770 | Good images, even images with black background could be printed. |
| 10 (comparative) | Plasticiser + release agent | PC | Dinch | Tego 450 | OK on standard images, ribbon stick on black images |
| 11 (comparative) | Plasticiser + release agent | PC | Dinch | Crodafos TSA | OK on standard images, ribbon stick on black images |

FIGURE 4

IMAGEWISE PRIMING OF NON-D2T2 PRINTABLE SUBSTRATES FOR DIRECT D2T2 PRINTING

TECHNICAL FIELD

The exemplary teachings herein pertain to methods and techniques for enabling D2T2 printing onto non-D2T2 printable substrates, and in particular, to the image-wise treatment of a plastic material to selectively render the surface D2T2 printable at the point of personalization. Specifically, the present disclosure relates to one or more processes for the image-wise plasticization or priming of polycarbonate or other non-D2T2 printable substrates for direct D2T2 printing, to one or more D2T2 ribbons used to accomplish the same, and to the products made by the one or more processes.

BACKGROUND

Dye diffusion thermal transfer printing (D2T2, also known as dye-sublimation or dye-sub), is a common digital printing technique in the ID card and security industry. To print a digital image using D2T2, a dye-sheet containing the dyes and a substrate known as a receiver is required. All receiver substrates must be able to accept the dyes during printing and to separate from the dyesheet without sticking. This can be a simple polymer that is able to accept dyes or a specially designed receiver coating that has been designed to function in a dye diffusion printer, as is the case in digital photography.

PVC is a widely used substrate in the card D2T2 printing industry due to its combination of properties: low cost; good dye receptivity; and it does not stick during printing. However, it has a relatively poor durability and is not the preferred substrate for other security printing techniques such as laser engraving. There are a number of other substrates of interest within the printing industry that offer certain advantages over PVC but there are various limitations to these alternative substrates.

In particular, polycarbonate (PC) is becoming a substrate of interest for card and ID applications, such as driver's licenses, student IDs or other ID cards, security badges, credit and debit cards and the like, due to its ability to be laser engraved and its general durability. However, PC cannot be directly printed by the common printing technique of dye diffusion thermal transfer (D2T2) printing. This is because the dye-sheet sticks to the PC surface during the high temperature, intimate contact of the D2T2 printing process, and the material also has poor dye receptivity for the dyes commonly used in D2T2 printing. The ability to diffuse small molecules from a polymer matrix is well known in the art as it forms the basic concept of D2T2 printing (see, e.g., European patent number EP0399690, the entire disclosure of which is herein incorporated by reference).

Accordingly, in D2T2 printing, a dye-sheet or ribbon is positioned in intimate contact with a substrate, on which it is desired to print a colored image. The dye-sheet or ribbon comprises a polyester (e.g. PET) substrate having a back coat, and a plurality of panels affixed in a suitable manner known in the art to the PET substrate on the side opposite the back coat. To aid adhesion of dye panels, an adhesive layer can be used on the PET base. This adhesive layer can be applied during base manufacture or coated onto PET prior to coating dye formulations.

Any mass transfer panel contained within a dye-sheet can be formulated such that it releases directly from PET base, or they can be applied on top of a releasing sub-coat. In the case of a base having a continuous adhesive applied prior to coating the panels, the releasing sub-coat may still be used.

A standard commercially available YMCKO dye-sheet or ribbon is illustrated in FIG. 1. As can be seen in FIG. 1, the five panels are affixed to the PET substrate, the last two removably affixed via a sub coat. These five panels in order are a yellow dye panel (Y), a magenta dye panel (M), a cyan dye panel (C), a black mass-transfer panel (K) and a mass transfer panel which can be used as a protective overlay (O), hence the acronym YMCKO. Ribbons may be of any format and panel length and other options are available, these include but are not limited to single color ribbons, YMC, YMCK, and YMCKOK. Other optional panels include but are not limited to diffusible security features, e.g., diffusive UV dyes, or other mass transfer features, such as UV pigments, metallic pigments, Optically Variable Pigments, taggants, etc. During D2T2 printing, the dye-sheet or ribbon is indexed over the substrate such that each of the panels is positioned over the substrate in succession. As is known in the art, a computer controlled thermal print head selectively heats each of the panels in the desired locations determined by a computer program to produce a colored image on the substrate.

The back coat on the PET substrate of the dye-sheet or ribbon aids in the transport across a thermal print head, and transfers heat from the thermal print head through to the dye-coats. When the yellow, magenta and cyan panels are heated, in turn, the respective colored dye is diffused from the panels at the locations where the heat is applied to produce the respective color on the substrate to form the image according to the computer image program. The amount of dye transferred is dependent on the temperature of the pixel of the print head. This is different from a mass transfer printing process where the transfer is either "on" or "off," and an image is built up with a dithered pattern of colored dots. In the D2T2 process, 256 shades of each component color can be achieved and each component color can be blended with the other two component colors, giving a huge color gamut (16.7 million colors), and hence, continuous tone images are possible. The panels comprise a polymer and the dye, which when heated causes the dye to diffuse onto the substrate, while the polymer remains attached to the PET substrate of the dye-sheet or ribbon.

The black panel is attached to the PET substrate, for example via a sub-coat, which allows the black panel, comprising a polymer and a black pigment, to be transferred to the card substrate at the locations where heat is applied. Thus, unlike the yellow, magenta and cyan panels, both the polymer and the black pigment of the black panel are transferred to the substrate where heated. Similarly, the mass transferable protective overlay panel (O) is completely transferred from the dye-sheet or ribbon and onto the substrate where heated, typically over the entire substrate. Other panels are possible and may be included, which can function as either diffusion or mass transfer depending on the materials used. These panels can function as security features when using materials that are fluorescent under UV light, optically variable pigments, taggants, etc.

As is known, a PC substrate is a non-D2T2 printable substrate. When conventional D2T2 printing is tried on PC, only extremely low density images can be achieved, which have unacceptable low density. More commonly, the dye-sheet will stick during the printing operation, However, there are a number of alternative ways in which color images can be added to PC. For example, a color image could be added to PC by using a mass transfer printing technique, wherein a thermal transfer ribbon (TTR) is used to transfer the polymer and pigment onto the card (as opposed to D2T2 or dye-sublimation). Such a method has the limitation that the image will not be of the same quality as a D2T2 image due to the necessary dithering of the image, resulting in lower quality printing.

A color image could also be added to PC by pre-coating the PC with an image receiving layer such as a copolymer of polyvinyl chloride/vinyl acetate. A product of this type is commercially available from Bayer Materials known as Makrofol ID. This option has the limitation that a specific pre-coated card stock is required, which may be more expensive, and the entire upper surface of the card is no longer PC.

Another method of adding a color image to PC is by thermally transferring a receiver layer as a mass transfer patch, of any shape or size, from a ribbon onto a particular area of the substrate. FIG. 2 illustrates a D2T2 dye-sheet or ribbon used in this method. The general concept of a thermally transferable receiver layer is disclosed by a number of patents including U.S. Pat. No. 5,006,502 and EP0333873, JP62297184, and JP61084281. The disclosures of each of these patents are herein incorporated by reference. As shown in FIG. 2, a thermally transferable dye receptive layer or patch is removably attached to a D2T2 dye-sheet or ribbon, which can be via a sub-coat, in front of the yellow dye panel. As such, the first layer or patch, when heated, is transferred to the PC card substrate prior to D2T2 printing.

Subsequently, a colored image can be D2T2 printed onto this thermally transferable dye receptive layer or patch. This option leaves most of the card surface as PC, which has an advantage over the option of pre-coating the PC with an image receiving layer. However, a layer or patch of an alternative polymer is transferred to the PC card surface so there will still be a section of the PC substrate surface that is no longer 100% PC.

A fourth method of adding a color image to PC is by pre-treating PC sheets to enable them to be D2T2 printed. The concept of pre-treating the PC sheet surface is disclosed in U.S. Pat. No. 6,867,167 issued to Trueb. However, this is a treatment of the whole card surface. This option could allow a 100% PC substrate to be D2T2 printed, but the treatment step is unrelated to the personalization step and the image. As such, this option offers no added security, and the non-imaged areas of the card could be imaged at a later stage. This would potentially allow tampering of an ID document.

Therefore, a need exists for an improved method of adding a color image to a PC substrate via direct D2T2 printing, which is directed toward overcoming these and other disadvantages of prior art methods. Accordingly, to address the above stated issues, an improved method to render a PC substrate surface D2T2 printable at the point of personalization is needed. The exemplary teachings herein fulfill such a need. It is desired that the methods and techniques for providing the above benefits be applicable to any instances or applications wherein images are to be printed on a non-D2T2 printable surface.

SUMMARY

The exemplary technique(s), system(s) and method(s) presented herein enable D2T2 printing on non-D2T2 printable substrates, through the use of a diffusible primer that can be printed image-wise according to a color image to be subsequently printed. The diffusible primer comprises a coating of polymer, plus small molecule agents that can be diffused into a substrate to alter its surface properties. The polymer should be such that it adheres to the PET material and the small molecules are preferably a release agent and plasticizer.

Release agents are commonly used in the art of D2T2 printing and include groups such as silicone, silicone resins, modified silicones, waxes, phosphoric acid ester surfactants, fluorine surfactants, fluorine compounds, long chain alkyl type compounds, higher fatty acid esters, and higher alcohols. However, these are typically added to receiver coatings during manufacture to assist with the release of the dye-sheet during printing, such as described in EP 0292 109 B1, the entire disclosure of which is herein incorporated by reference.

Plasticizers are small molecules which can penetrate a polymer matrix and reduce intermolecular forces and increase free volume by pushing the polymer chains apart. This can make it easier for other penetrants to enter the polymer matrix. These small molecules may be solid, liquid or gas at room temperature.

The diffusible primer is coated onto a PET substrate (optionally with adhesive) with a back coat on the opposite side of the PET film. This can be in a continuous format or in a paneled ribbon which can include but is not limited to Y, M, C, K and O panels to form a dye-sheet. Other panels are possible and may be included which can function as either diffusion or mass transfer depending on the materials used. These panels can function as security features when using materials that are fluorescent under UV light, optically variable pigments, metallic pigments, taggents, etc.

The primer formulation is designed such that the polymer sticks to the PET base. The polymer does not transfer during printing, as opposed to a mass transfer technique, and the release agent and/or plasticizer are designed to diffuse out of the polymer binder into the receiver substrate, e.g., a PC substrate, at the locations at which heat is applied.

An image may be D2T2 printed onto a PC substrate or other non-D2T2 printable substrate, using this "primer" ribbon, whereby the release agent and/or plasticizer will diffuse from the coated polymer into the non-D2T2 printable substrate surface according to the computer image program. This renders these specific areas of the non-D2T2 printable substrate directly D2T2 printable. The plasticizer allows the dye molecules from the D2T2 ribbon to enter the polymer matrix, and the release agent prevents the dye-sheet from sticking to the receiver substrate during the printing step.

The disclosed methods and techniques provide for the ability to transfer required release agents and/or plasticizers from a D2T2 thermal transfer ribbon, without transfer of polymer, thus leaving the entire substrate surface as PC. The disclosed methods and techniques also provide for the ability to transfer the release agent and/or plasticizers image-wise, thus making the substrate D2T2 printable only at the point of issuance of the card and only according to the color image to be printed.

Additional objects, advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accordance with the present teachings, by way of example

FIG. 4 is a chart showing comparative test result of examples of specific plasticizers and/or release agents used in accordance with the present disclosure;

DETAILED DESCRIPTION

The following description refers to numerous specific details which are set forth by way of examples to provide a thorough understanding of the relevant teachings. It should be apparent to those skilled in the art that the present teachings may be practiced without such details. In other instances, well known methods, procedures, and components have been described at a relatively high-level, without detail, in order to avoid unnecessarily obscuring aspects of the present teachings.

Figure 1:
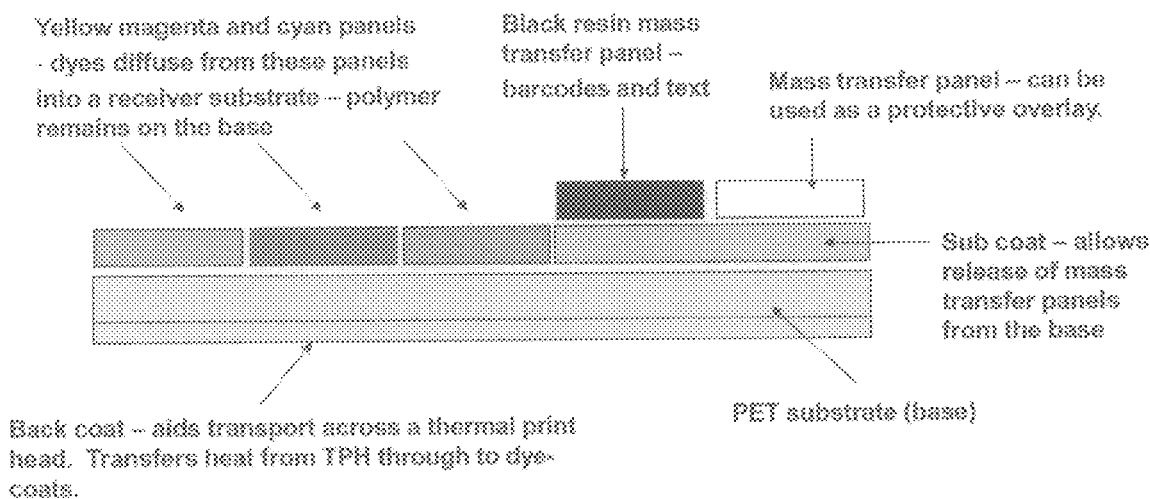
FIG. 1 is a schematic cross-sectional illustration of a prior art, standard YMCKO dye-sheet or ribbon.
Figure 2:
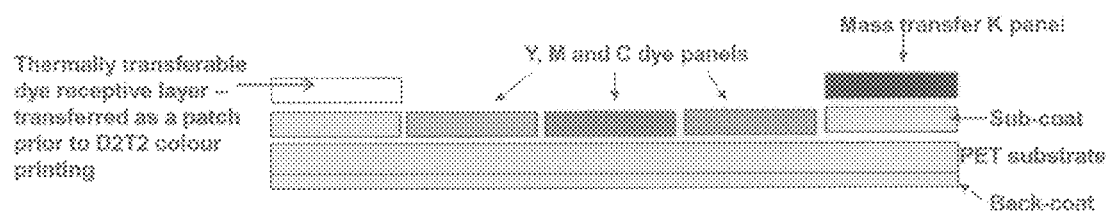
FIG. 2 is a schematic cross-sectional illustration of a prior art D2T2 dye-sheet or ribbon having a mass transfer receptive layer.
Figure 3:
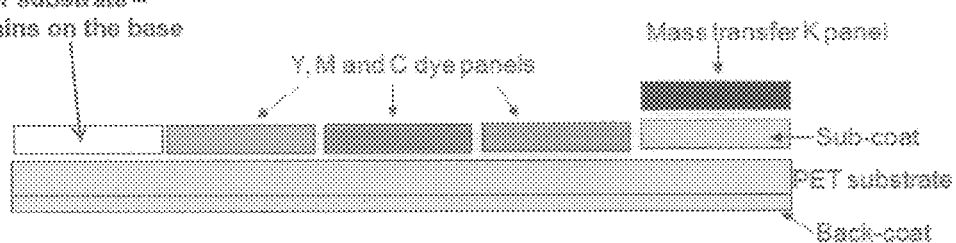
FIG. 3 is a schematic cross-sectional illustration of an exemplary embodiment of a D2T2 dye-sheet or ribbon having a diffusible prime layer according to the present disclosure.

Referring now to FIG. 3, for the sake of illustration purposes only, without limitation, one embodiment of a D2T2 dye-sheet or ribbon incorporating the teachings of the present disclosure is shown. It should be understood that the primer of the present disclosure can be added to any known printing ribbon, and other ribbons incorporating the primer of the teachings herein are contemplated. For example, the ribbon may be a continuous format for use in modular printing machines or as part of paneled product for use in single head printers.

In the example of FIG. 3, the D2T2 dye-sheet or ribbon of the present disclosure may include, for example, five panels, as illustrated, attached to a PET substrate having a back coat. The five panels illustrated are, in order, a prime layer or panel (P), yellow dye panel (Y), a magenta dye panel (M), a cyan dye panel (C), and a black polymer and pigment panel (K). It should also be understood that the panel P can be combined in a paneled ribbon of any format with panels of any size, and can incorporate optional extra features including but not limited to diffusible security features, e.g. diffusive UV dyes, or other mass transfer features, such as UV pigments, metallic pigments, Optically Variable Pigments, taggents, etc.

During D2T2 printing, the dye-sheet or ribbon is indexed over the substrate such that each of the panels is positioned over the substrate in succession. A computer controlled thermal print head selectively heats each of the panels, in turn, in the desired locations determined by a computer program to produce a colored image on the substrate.

The prime layer comprises a polymer, and a release agent and/or plasticizer. At the beginning of the D2T2 printing process, the prime layer panel is selectively heated at various locations according to the computer image program (i.e., image-wise), whereupon, the release agent and/or plasticizer diffuse from the panel and into the substrate, according to the computer image program, at the locations where the colored image will be printed. When the yellow, magenta and cyan panels are heated, in turn, the respective colored dye is diffused from their panels at the locations where the heat s applied to produce the respective color on the substrate, where primed, to form the image according to the computer image program.

If desired, the polymer and the black pigment of the black panel can also be transferred to the substrate where heated, to personalize the substrate with the desired information, which may include for example, barcodes and text. If present, a mass transfer protective overlay panel (O) could then be completely transferred from the dye-sheet or ribbon and onto the substrate where heated, typically over the entire substrate.

In this manner, the surface of the non-D2T2 printable substrate is rendered D2T2 printable but only in the specific location where the color image will be printed (i.e., image-wise), and at the point of personalization. The amount of plasticizer and/or release agent transferred at the beginning of the D2T2 printing will depend on the color image to be printed. If an area of high density color is to be subsequently printed, then a large amount of release agent and/or plasticizer will be transferred. If only low density color is required in a particular area then only a small amount of plasticizer and/or release agent will be transferred. This means that the non-D2T2 printable substrate is rendered (at point of personalization) printable only by that given image, as determined by the computer image program. The intensity and duration of the heat applied to the panels by the individual heating wires of the thermal print head controls the amount of primer diffused into the non-D2T2 printable substrate in any given location.

If one image was used to "prime" the card and a different image used to color print the card, then the high and low density areas may not align and poor density or ribbon sticking issues would be encountered. Therefore, it is preferable to use only one computer image program to control both the primer printing and the color printing. The substrate and each panel of the D2T2 dye-sheet or ribbon are specifically registered such that the primer printing and the color printing are properly aligned.

As the primer is transferred according to the color image to be printed, the rest of the card surface is left unadulterated, i.e., is pure PC and hence not printable by D2T2 printing. Also as there is no mass transfer of polymer during the diffusion printing step, the prime and color printing processes occur as a diffusion process. The card could still be classified as "100% PC polymer" and thus still offer all of the benefits of PC substrates.

The primer has been illustrated in FIG. 3 as a panel, forming part of a paneled D2T2 ribbon, with an acronym of PYMCK, for use in single head type printers, where P=the primer panel. It should be understood however that the primer could be coated as a continuous coating on to a base material to create a continuous primer ribbon for use in a central issue modular type D2T2 printer. It should also be understood that the panel P can be combined in a paneled ribbon of any format with panels of any size. Some of the benefits the presently disclosed method and system have over the prior art are the ability to transfer required release agents and plasticizers from a thermal transfer ribbon, without transfer of the polymer binder (leaving the entire surface as PC), and the ability to transfer the release agent and plasticizers image-wise, thus making the substrate D2T2 printable only at the point of issuance of the card and only according to the color image to be printed.

A further embodiment of the present disclosure would be to utilize the above image-wise "priming" of a non-D2T2 printable substrate such as PC, and combine this with an in-line plate lamination technique as described below. Combining these two techniques would allow production of a 100% PC substrate with a D2T2 image within the card body, thus making it extremely durable and tamper proof.

Currently, color personalization occurs after a full card body has been formed, and the image is formed on the card, not in it. In this case, the image can be protected post-printing with an overlay or a laminate, but this can have lifetime and/or tamper proof limitations.

Figure 6:
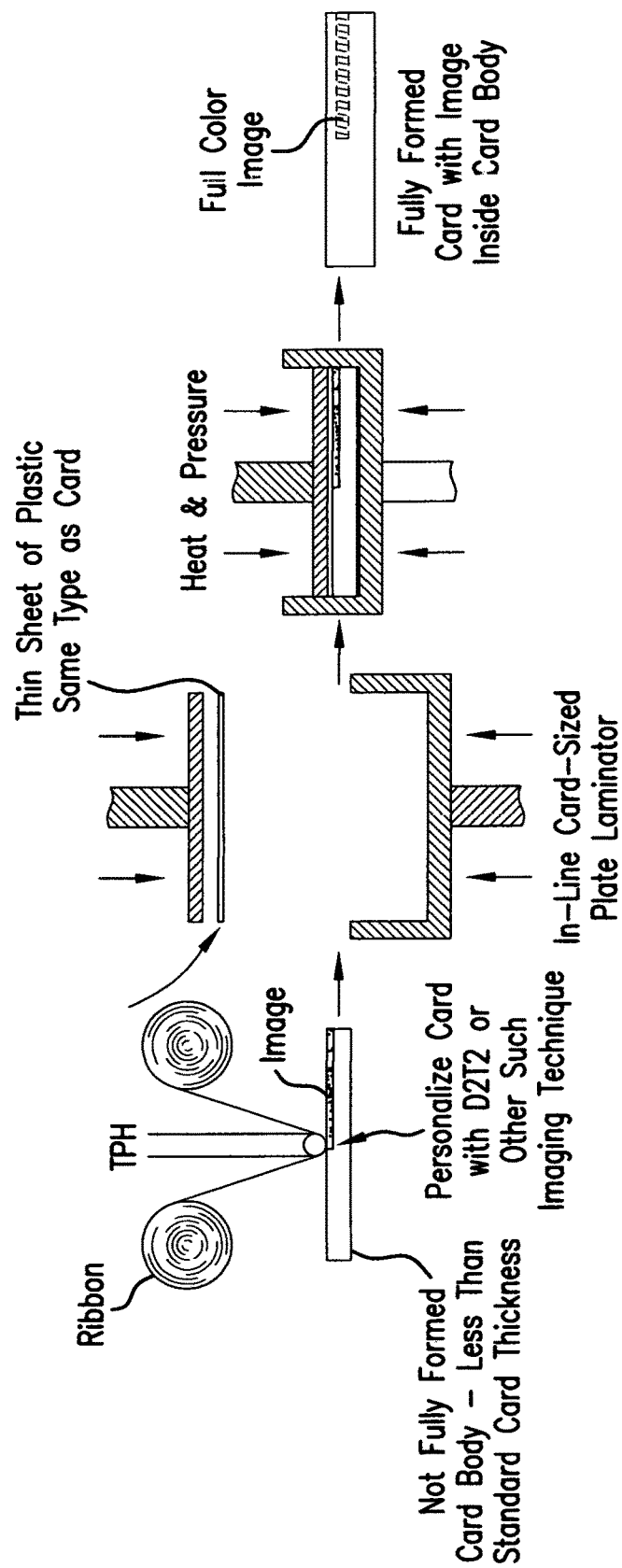
FIG. 6 is a schematic diagram of an exemplary embodiment of a post-personalization plate lamination method of the present disclosure.

Imaging of cards prior to full formation and cutting into standard CR80 card size can be done currently but only on a large scale. That is therefore not individual card personalization but merely background imaging. If full card body formation could be done post-personalization, then an individually color imaged card with excellent durability would be produced. In order to solve this problem, an in-line card-sized plate laminator is disclosed in FIG. 6. The initial card stock to be used would not be of full card size thickness. This initial card stock would be printed with D2T2, TTR or any other such imaging technique. The initial card stock would then be passed into a miniature plate laminator along with a thin sheet of plastic of the same type as the printed initial card stock.

Application of heat and pressure would allow the two plastic sheets to fuse, and a full card body of standard thickness with a full color personalized image within the card body would be formed. This technique could be combined with the above disclosed image-wise plasticization of PC to allow a full color D2T2 image to be formed within the body of a 100% polycarbonate card.

The technique of forming the full card body structure post-personalization need not be limited to an in-line process. The same technique of taking a non-full thickness pre-personalized plastic material and forming the full card body structure post-personalization could be used in an off-line plate laminator, more preferably a larger, stacked plate laminator such that a number of cards could be produced at once, and therefore keeping pace with the personalization step.

A combination of these two techniques could allow formation of a 100% PC, full card body with an encapsulated D2T2 image. However, even without post-personalization plate lamination, this resulting 100% PC, full body card with D2T2 image still offers further benefits for secure ID documents over the prior art. If a counterfeiter attempts to remove the D2T2 image, he/she would also remove the ability to D2T2 print the substrate, therefore making it extremely difficult for the counterfeiter to add an alternative image. "Solvent washing" the image from the PC substrate would also wash away the release agent and plasticizer that had been previously applied, thus rendering the PC surface non-D2T2-printable again. If a "shaving" technique of removing the top layer of the PC surface were utilized, the release agent and plasticizer would again be removed along with the color image, and the PC substrate would be rendered non-D2T2-printable.

Even if no "removal technique" is utilized and the counterfeiter attempts to alter the image in a more subtle manner, e.g., adding a dark beard to a pre-existing ID image, then this technique should still prevent easy tampering. As the prime is applied image-wise via a diffusion technique, even if an area has been rendered "printable," it is not an "on/off" printable situation. If the original image were of low density, then prior to printing the legitimate image, only a low level of prime will have been transferred. Therefore, if a darker image is printed on top of the original image, the above mentioned difficulties of D2T2 printing PC will still exist.

EXEMPLIFICATION

By way of example, "Primer" ribbons as illustrated in FIG. 3 were prepared by making a solution of polymers designed to adhere to a PET base whilst allowing small molecules to diffuse from the polymer matrix when heated. To aid adhesion of the formulations as per the invention, an adhesive layer can be used on the PET base. This can be either applied during the PET manufacture or coated onto the PET prior to coating the formulations of the invention. The basic polymer formulation was based on previously patented formulations as per EP0399690, the entire disclosure of which is herein incorporated by reference. However, the scope of this disclosure is not limited to the polymeric binder system listed here, and is given only as an example. Alternative binder polymers may be utilized depending on the specific requirements of the chosen plasticizer and release agent. To the basic polymer formulation, a range of release agents and plasticizers were added as described below. These are given as an example only and do not indicate a complete list of possible materials, and are not limiting, Sample Preparation—Stock solutions of the binders were prepared as follows:
Polyvinyl Butyral (PVB) Stock
20 g PVB BX1
160 g THF
Ethyl Cellulose (ECT) Stock
ECT T10
40 g THF
These were used to prepare solutions as follows:
Solution A
Plasticizer Only (Comparative)
0.4 g Plasticizer
4.3 g PVB stock
0.6 g ECT 10 stock
7.0 g THF
Solution B
Plasticizer+Release Agent (Invention)
42 g PVB stock
6 g ECT 10 stock
2 g Solution A
70 g THF 0.2 g of the release agent was then added to 9.8 g of the above stock and stirred for at least half an hour prior to coating.

Coatings were applied using an MB3 meyer bar to a 6 micron Diafoil K206 base that had been previously coated with a back coat (used to protect the PET base during printing) as per previous disclosures EP0703865 and EP0547893, the entire disclosures of which are herein incorporated by reference. The coatings were spliced into a standard D2T2 ribbon and printed as a dye diffusion panel onto polycarbonate substrates using a desktop D2T2 printer (Evolis, Pebble-3). Other printers may be used and the choice of printer was only used as an example. The teachings herein are applicable to all D2T2 printers. D2T2 color images were then printed using a standard YMCKO ribbon (ITW Imagedata).

Examples—Comparative vs. Invention

The following compounds were tested as plasticizers:
"Dinch"=Hexamoll DINCH

"DMI"=Dimethyl Isophalate
"ADP"=Adipic acid
"OCT"=1,8 octanediol
"Phs"=Phenyl Salicylate The following compounds were tested as release agents:
"Tego 410"=Tegoglide 410
Diax 2770
"Tego 450"=Tegoglide 450
Crodafos T5A The result of this comparative testing is illustrated in FIG. 4.

Figure 5:
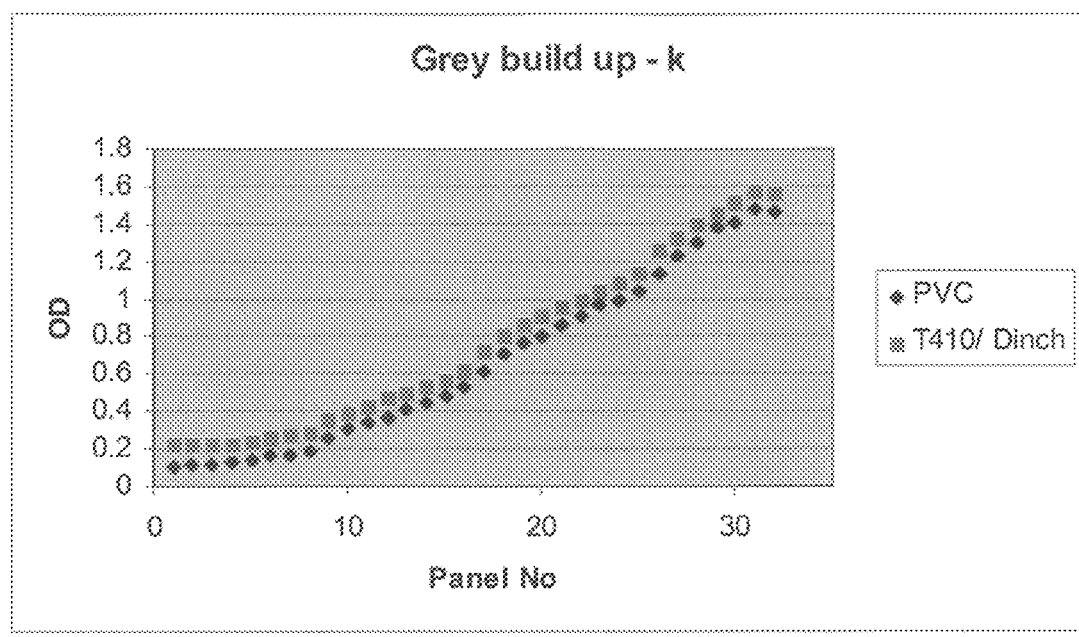
FIG. 5 is a graph showing a comparison of the Optical Density (OD) build up that can be achieved with an embodiment of the present teachings verses standard PVC cards.

The graph of FIG. 5 shows a comparison of the optical density (OD) build up that can be achieved with the primer of example 8, against standard PVC cards. Clearly when utilizing this primer, PC substrates can be rendered D2T2 printable, and optical densities equivalent to printing on standard PVC cards can be achieved.

The amounts of release agent and plasticizer used in the above experiments are not fixed and are given as an example only. The concentrations of release agent and plasticizer may be varied depending on the level of release and improvements to dye receptivity required. The concentrations could also depend on choice of non-D2T2 substrate to be printed, dyesheet properties and printer requirements.

While the foregoing discussion presents the teachings in an exemplary fashion with respect to the disclosed methods and techniques for enabling D2T2 printing on non-D2T2 printable surfaces, and the products produced by the methods and techniques, it will be apparent to those skilled in the art that the teachings may apply to any type of printing or application that requires the treatment of the surface of a substrate. Further, while the foregoing has described what are considered to be the best mode and/or other examples, it is understood that various modifications may be made therein and that the subject matter disclosed herein may be implemented in various forms and examples, and that the teachings may be applied to numerous applications, only some of which have been described herein.

What is claimed is:

1. A diffusible primer material, releasably contained within a non-transferrable polymer binder on a carrier substrate, that can be printed image-wise to make plastic substrates D2T2 printable, wherein the diffusible primer material comprises a release agent and a plasticizer.

2. The diffusible primer material of claim 1, wherein the carrier substrate is a polyester film.

3. The diffusible primer material of claim 1, wherein the carrier substrate is a dye-sheet.

4. A D2T2 thermal transfer ribbon comprising:
a diffusible primer material in the form of a panel, wherein the diffusible primer material comprises a release agent and a plasticizer, and is releasably contained within a non-transferrable polymer binder on a carrier substrate, and
at least one color panel on the carrier substrate;
wherein the release agent and the plasticizer are adapted to diffuse into a polycarbonate substrate upon heating of the panel of diffusible primer material.

5. The D2T2 thermal transfer ribbon of claim 4, wherein the diffusible primer material is adapted to diffuse into the polycarbonate substrate according to a computer image program corresponding to a color image.

* * * * *